United States Patent Office 3,324,073
Patented June 6, 1967

3,324,073
TRANSPARENT, STRESS-CRACK RESISTANT POLYHYDROXY-ETHER COMPOSITIONS
George H. Potter, St. Albans, and Clyde J. Whitworth, Jr., and Nathan L. Zutty, Charleston, W. Va., assignors to Union Carbide Corporation, a corporation of New York
No Drawing. Filed Dec. 17, 1964, Ser. No. 419,189
8 Claims. (Cl. 260—37)

This invention relates to transparent, stress-crack resistant thermoplastic polyhydroxyether compositions and particularly those modified with asbestos.

Thermoplastic polyhydroxyether has many physical properties advantageous in container applications such as transparency, toughness, high tensile strength, and outstanding gas impermeability. Significantly, thermoplastic polyhydroxyether in addition to being tough, is relatively easily formable by any of the conventional thermoplastic fabricating techniques including cold forming, blow molding, extruding, compression molding and other methods known in the plastics art.

In container applications, including conventional packaging, such as wrapping film and bottles, as well as piping, cable jacketing, and wire insulation, a thermoplastic material must be capable of resisting attack by common chemicals found in the environment and of course, the substance being contained.

Unfortunately, thermoplastic polyhydroxyether shares the shortcoming of many other thermoplastic polymers, such as, styrene polymers, in exhibiting lower stress crack resistance upon exposure to packaged materials and solvents than it does in other environments.

It is, therefore, an object of the present invention to impart enhanced resistance to stress cracking upon exposure of thermoplastic polyhydroxyether to chemically active environments.

However, for packaging films and bottles, it is not sufficient that this object be achieved if other properties of the thermoplastic polyhydroxyether, such as clarity, are concomitantly adversely affected.

It is, therefore, another object to maintain the clarity of thermoplastic polyhydroxyether while improving its environmental stress crack resistance.

Thermoplastic polyhydroxyether compositions have now been discovered wherein the foregoing and other objects are realized.

It has now been discovered that the inclusion of from about 2% to 12% by weight of refined, water-dispersed, opened asbestos fibers, based on the weight of thermoplastic polyhydroxyether, greatly increases the environmental stress-crack resistance of the thermoplastic polyhydroxyether while retaining its desirable properties including clarity.

This discovery is not only unexpected, but puzzling in that this amelioration is obtainable only within a relatively narrow range with a sharp regression to poor stress-crack resistance being encountered on passing outside this range.

The asbestos used in the practice of this invention is preferably refined, water-dispersed and opened short fiber chrysotile such as Coalinga highly refined asbestos obtained from asbestos deposits near Coalinga, Calif. The Coalinga asbestos is composed of a large proportion of short fiber asbestos which is readily dispersed into individual fibers. It is conventional among most asbestos producers to classify chrysotile asbestos fibers by fiber length into short, medium and long using the Quebec Standard Test (as described in the Encyclopedia of Chemical Technology, vol. 2, page 138, 1960, Interscience Publishers, New York) and to price them accordingly with the short the cheapest and the long the most expensive.

If desired, other forms of asbestos, such as, anthophyllite or amosite can also be used if refined, water-dispersed and opened as explained below.

The refined asbestos used in this invention is obtained by the dispersion of the asbestos in water to break up the asbestos fibrous mass into small clusters of asbestos fibers and to some extent into minute individual fibers. Water-dispersion of the asbestos is preferably obtained through agitation of asbestos in water in the presence of a chemical dispersing agent, such as aluminum chloride. This dispersion technique is described in U.S.P. 1,907,616 and U.S.P. 2,661,287, for example. Additional methods of dispersing the asbestos employing chemical dispersing agents are described in U.S. 2,626,213 and U.S. 2,652,325. These small clusters and minute fibers preferably contain surface electrical charges which aid in maintaining the dispersed state. When dispersing agents such as aluminum chloride and ferric chloride are used, the water-dispersed asbestos has electro-positive surface charges.

Dispersion of asbestos fibers in water will generally remove substantially all of the impurities, such as colorants, gangue and abrasive materials. This is especially true if chemical dispersing agents are employed. The presence of abrasive materials or electrical conductors, such as magnetite, in the asbestos can cause difficulty in subsequent processing steps for the production of modified thermoplastic polyhydroxyethers.

An aqueous suspension of water-dispersed asbestos can be flocculated by the addition of any acid or base which will adjust the pH of the dispersed asbestos slurry to a value outside the range of about 2 to 7.5. An alternate means of flocculation is the addition of an interfering or flocculating ion, such as sulfate, nitrate or phosphate. The flocculated asbestos can be "redispersed" to a colloidal suspension, if desired, by adjusting the pH to a value within the range of about 2 to 7.5 or by removing the interfering ion. Useful flocculants are hydrochloric acid, sulfuric acid, sodium carbonate, aluminum sulfate, ammonium hydroxide, sodium hydroxide and the like. Such flocculated fibers can then be filtered and dried. This compacted form of water-dispersed asbestos can be introduced "as is" directly to molten thermoplastic polyhydroxyether for production of the modified polymer. Alternatively, the compacted water-dispersed asbestos can be broken up into fluffy material by mechanical means, such as a hammer mill, before introducing it into the polyhydroxyether.

The water-dispersed asbestos useful in the present invention can be conveniently characterized in terms of its flocculated and dried form. Measurements are generally made on an "opened" form of the product.

In the following description of characterization tests, the asbestos fibers, before being tested, are generally opened by one pass through a laboratory size Mikropulverizer employing a screen with 0.046 in. slots.

DRY BULK DENSITY

Opened asbestos fiber is loaded into a tared standard volume (12 in. x 12 in. x 12 in.) after passing the fiber through a 19 in. long fluffing column. The distance from the bottom of this column to the receiving container is 12 inches. The container is filled so that a 6-inch peak stands up above the top. This peak is carefully removed with a straight-edge and the gross weight of the container is determined. By subtracting the tare weight, the weight of asbestos is obtained directly in pounds per cubic foot. Water-dispersed asbestos useful in the process of the present invention should have a dry bulk density obtained in this manner of less than about 3 pounds per cubic foot.

Non-dispersed prior art asbestos fibers generally had a dry bulk density of greater than about 6 pounds per cubic foot and generally about 7–8 pounds per cubic foot.

WET BULK VOLUME

Twenty grams of opened asbestos fibers are placed in a 1-liter graduated cylinder and sufficient water is added to form 1-liter of asbestos-water slurry. The cylinder is then inverted ten times to insure uniform mixing. The cylinder is then set in an upright position and allowed to settle for three hours. At the end of this time the volume of the bulked asbestos is read in milliliters. Water-dispensed asbestos useful in the present invention should have a value greater than about 300 ml. and preferably greater than about 500 ml. Non-dispersed asbestos fiber generally has a value less than about 300 ml. and quite frequently below about 200 ml. in this test.

The sensitivity of the wet bulk volume test described above can be increased by additional mechanical agitation of the asbestos-water slurry. In this version of the wet bulk volume test, forty grams of opened asbestos are mixed with water to form two liters of asbestos-water slurry. This slurry is then placed in a well known pulp disintegrator and agitated and beaten for 2 min. The disintegrator is described in TAPPI (Technical Association of the Pulp and Paper Industry) Standard T–205 m–58, Appendix A. The slurry is then discharged, divided substantially in half and poured into two separate 1-liter graduated cylinders. Additional water is added to each cylinder to form 1-liter portions of asbestos-water slurries. These cylinders were then inverted and allowed to stand according to the above described procedure. Water-dispersed asbestos results in a bulked asbestos volume of greater than 900 ml. in this test while non-dispersed asbestos has wet bulk volume less than about 500 ml. in this test.

OIL ADSORPTION

A 5 gram sample of asbestos fibers is placed in a 500 ml. mortar. Di-octyl phthalate (DOP) is added dropwise from a graduated burette to the asbestos in the mortar. The resulting mixture is ground between the mortar and a pestle until sufficient DOP has been added to cause formation of a paste that adheres to the pestle. The end point is taken at the time when all of the asbestos-DOP mixture adheres to the pestle. Since oil adsorption data for prior art asbestos are generally based on a 10-gram asbestos sample, the measured quantity of DOP adsorbed on the 5-gram sample is multiplied to 2 to give the results in milliliters DOP/10 grams of fiber for comparison purposes. Dispersed asbestos fiber useful in the present invention should have an oil adsorption value greater than about 14 milliliters DOP/10 grams of opened fiber. Prior art non-dispersed opened asbestos fibers had an oil adsorption of about 8–10 milliliters DOP/10 grams of fiber.

REFLECTANCE

Three to five grams of asbestos fiber are rapidly agitated in about 300 to 500 ml. of clear water. The resulting slurry is vacuum filtered to produce a uniform filter cake. The filter cake is oven-dried at 105° C., preferably calendered, and the reflectance measured on the top and bottom surfaces of the resulting product. Reflectance is measured according to TAPPI Standard T–452 m–58 and reported as percent of ultimate reflectance based on magnesium oxide as 100 percent reflectance. Dispersed asbestos useful in the present invention should preferably have an average reflectance value based on top and bottom readings greater than about 72 percent. The useful reflectance range is about 70 to about 80 percent. Prior art non-dispersed asbestos fiber had average reflectance values in the range of about 48 to about 72 percent.

MAGNETIC FRACTION

This determination is made by mixing a small portion of opened asbestos fiber in water to form a thin pulp slurry and then removing magnetic material from this slurry with a magnet. The magnetic material thus obtained is then mixed with water to form a new pulp and this pulp is then cleaned of magnetic material with a magnet. The resulting material attracted to the magnet is designated as cleaned magnetics. The percent magnetic fraction is then determined as follows:

$$\frac{\text{Weight of cleaned magnetics}}{\text{Weight of original sample}} \times 100 = \text{percent magnetic fraction}$$

Dispersed asbestos useful in the present invention should have a magnetic fraction less than about 1.0 weight percent and preferably less than about 0.5 weight percent. Prior art non-dispersed asbestos had magnetic fractions greater than 1.0 weight percent and generally greater than 2.0 weight percent. The test for magnetic fraction can conveniently be carried out in the pulp sample employed above for measurement of wet bulk density.

An alternate method can be used to measure the magnetic fraction of the asbestos. This method involving the electromagnetic properties of asbestos is described in ASTM (American Society for Testing Materials) Standard D–1118–57. The water-dispersed asbestos useful in the present invention should have a magnetic fraction less than about 1.0 weight percent and preferably less than about 0.5 weight percent as measured by this latter technique.

While about 2 to 12% refined, water-dispersed, opened asbestos fibers can be used in the compositions of this invention, it is preferred in order to attain the best balance of enhanced stress crack resistance and clarity to employ a range of about 6 to 10% refined asbestos fibers.

The thermoplastic polyhydroxyether compositions of this invention are particularly useful in the fabrication of containers and packages where the packaged goods are preferably visible to the consumer, as for example, in shampoos including those made from saponified natural oils such as olive, cocoanut, almond, castor, cottonseed, peanut, palm kernel and fish oils as well as lard and tallow and the like, alcohols and esters, hair wave lotions, cosmetics, dandruff remedies, skin conditioners and the like, where stress-crack resistance and clarity are both required.

The term "thermoplastic polyhydroxyether" herein refers to substantially linear polymers having the general formula:

$$\pm D-O-E-O\pm_n$$

wherein D is the radical residuum of a dihydric phenol, E is an hydroxyl containing radical residuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced viscosity} = \frac{t_s - t_o}{ct_o}$$

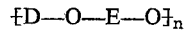

wherein $t_o$ is the efflux time of the solvent (tetrahydrofuran), $t_s$ is the efflux time of the poly(hydroxyether) solution, $c$ is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear phenol such as those having the general formula:

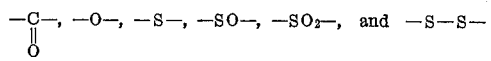

wherein Ar is an aromatic divalent hydrocarbon such as naphthylene, and, preferably, phenylene, Y and $Y_1$ which can be the same or different are alkyl radicals, preferably having from 1 to 4 carbon atoms, halogen atoms, i.e., fluorine, chlorine, bromine, and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example, $$-\underset{\underset{O}{\|}}{C}-,\ -O-,\ -S-,\ -SO-,\ -SO_2-,\ \text{and}\ -S-S-$$

and divalent hydrocarbon radicals such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane, 2,4' - dihydroxydiphenylmethane, bis(2 - hydroxyphenyl)methane, bis(4 - hydroxyphenyl) methane, bis(4 - hydroxy-2,6-dimethyl-3-methoxyphenyl) methane, 1,1-bis(4-hydroxyphenyl)ethane, 1,2-bis(4-hydroxyphenyl)ethane, 1,1-bis(4-hydroxy-2-chlorophenyl) ethane, 1,1-bis(3-methyl-4-hydroxyphenyl)ethane, 1,3-bis (3-methyl-4-hydroxyphenyl)propane, 2,2-bis(3-phenyl-4-hydroxylphenyl)propane, 2,2-bis(3 - isopropyl-4-hydroxyphenyl)propane, 2,2-bis(2 - isopropyl-4-hydroxyphenyl) propane, 2,2-bis(4-hydroxynaphthyl)propane, 2,2-bis(4-hydroxyphenyl)pentane, 3,3-bis(4 - hydroxyphenyl)pentane, 2,2-bis(4 - hydroxyphenyl)heptane, bis(4-hydroxyphenyl)phenylmethane, bis(4-hydroxyphenyl)cyclohexylmethane, 1,2-bis(4-hydroxyphenyl - 1,2 - bis(phenyl)propane, 2,2-bis(4-hydroxyphenyl)1-phenyl-propane and the like;

Di(hydroxyphenyl)sulfones such as bis(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like;

Di(hydroxyphenyl)ethers such as bis(4-hydroxyphenyl) ether, the 4,3'-, 4,2'-, 2,2'-, 2,3'-, dihydroxydiphenyl ethers, 4,4'-dihydroxy-2,6-dimethyldiphenyl ether, bis(4-hydroxy-3-isobutylphenyl)ether, bis(4-hydroxy-3-isopropylphenyl) ether, bis(4-hydroxy-3-chlorophenyl)ether, bis(4-hydroxy-3 - fluorophenyl)ether, bis(4 - hydroxy - 3-bromophenyl) ether, bis(4-hydroxynaphthyl)ether, bis(4-hydroxy-3-chloronaphthyl)ether, bis(2-hydroxydiphenyl)ether, 4,4'-dihydroxy-2,6-dimethoxydiphenyl ether, 4,4'-dihydroxy-2,5-diethoxydiphenyl ether, and the like;

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2 - bis(p - hydroxyphenyl) - 1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

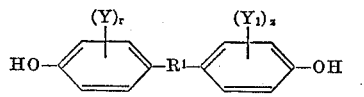

wherein Y and $Y_1$ are as previously defined, $r$ and $z$ have values from 0 to 4 inclusive, and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

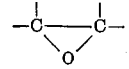

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen $-O-$, oxacarbonyl oxygen

carbonyl oxygen,

and the like.

Specific examples of monoepoxides include epichlorohydrins such as epichlorohydrin, epibromohydrin, 1,2-epoxy - 1 - methyl - 3 - chloropropane, 1,2 - epoxy - 1-butyl - 3 - chloropropane, 1,2 - epoxy - 2 - methyl - 3-fluoropropane, and the like.

Illustrative diepoxides include diethyl glycol bis-(3,4-epoxycyclohexane-carboxylate), bis-3,4-epoxycyclohexylmethyl)adipate, bis(3,4 - epoxycyclohexylmethyl)phthalate, 6-methyl, 3,4-epoxycyclohexyl-6-methyl-3,4-epoxycyclohexane carboxylate, 2 - chloro - 3,4 - epoxycyclohexylmethyl - 2 - chloro - 3,4 - epoxycyclohexanecarboxylate, diglycidal ether, bis (2,3-epoxycyclopentyl)ether, 1,5-pentanediol bis (6-methyl-3,4-epoxycyclohexylmethyl)-ether, bis(2,3-epoxy-2-ethylhexyl)adipate, diglycidyl maleate, diglycidyl phthalate, 3-oxatetracyclo[4.4.0.1$^{7,10}$.0$^{2,4}$]-undec-8-yl 2,3-epoxypropyl ether, bis(2,3-epoxycyclopentyl)sulfone, bis(3,4-epoxyhexoxypropyl)sulfone, 2,2'-sulfonyldiethyl bis (2,3-epoxycyclopentanecarboxylate), 3-oxatetracyclo[4.4.0.1$^{7,10}$.0$^{2,4}$]undec - 8 - yl 2,3 - epoxybutyrate, 4-pentenal-di-(6-methyl-3,4-epoxycyclohexylmethyl)acetal, ethylene glycol bis (9,10-epoxystearate), diglycidyl carbonate, bis(2,3 - epoxybutylphenyl) - 2 - ethylhexyl phosphate, diepoxydioxane, butadienedioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping

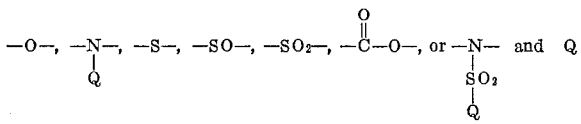

wherein A is an electron donating substituent such as

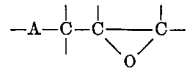

is a saturated hydrocarbon radical such as an alkyl, cycloalkyl, aryl or aralkyl radical.

The water-dispersed, refined asbestos modified polyhydroxyether composition of this invention can be prepared by conventional, thermoplastic blending techniques which provide intimate homogenization of the blend. It is preferred to carry out at least a portion of the mixing under conditions of temperature and shear sufficient to flux the polyhydroxyether to insure homogeneity. This portion of the mixing is advantageously effected in a Banbury mixer or a two-roll mill.

The examples which follow wherein all parts and percentages are by weight unless otherwise specified further illustrate the invention.

Example 1

The thermoplastic polyhydroxyether used was prepared by the reaction of equimolar amounts of 2,2-bis(4-hydroxyphenyl)-propane and epichlorohydrin together with sodium hydroxide. Equipment used was a vessel provided with an agitator, thermometer, and reflux means. There was placed in the vessel:

|   | Parts |
|---|---|
| 2,2-bis(4-hydroxyphenyl)propane | 114.5 |
| Epichlorohydrin (99.1%) pure | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added to the vessel. Heating of the mixture at 80° C. was continued another two hours. There was added to the vessel an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added to the vessel and agitated with the contents to dissolve salts present in the reaction mixture. The vessel contents were allowed to settle for ten minutes during which time a lower brine phase formed. The lower phase was separated by decantation. The upper polymer-solution-containing phase was washed successively with two 160 part portions of water and a mixture of 85% phosphoric acid with 100 parts of water (pH=2) for one hour. The upper polymer solution phase was again separated by decantation and water washed with four successive 200 part portions of water containing 4.5% butanol. The washed polymer was then coagulated in isopropanol, filtered and dried. There was thus obtained a thermoplastic polyhydroxyether of 2,2-bis-(4-hydroxyphenyl)propane and epichlorohydrin having a melt flow of 7.0 decigrams per minute. Melt flow of the thermoplastic polyhydroxyether was determined by weighing in grams the amount of polyhydroxyether which, at a temperature of 220° C. and under a pressure of 44 p.s.i., flowed through an orifice having a diameter of 0.0825" and a length of 0.315" over a ten minute period. Four such determinations were averaged and reported as decigrams per minute under a pressure of 44 p.s.i. and at 220° C.

TABLE 1

| Example | Asbestos by wt. Percent | Type | Stiffness Modulus, 24° C. (p.s.i.) | Tensile Strength, p.s.i. | Elongation, Percent | Yield Stress, p.s.i. | Yield Elongation, Percent | Haze,[1] Percent, 15 mils | Time to Failure in 50% by vol. Aqueous Methanol [2] | Izod Impact,[3] ft.-lbs./in. Notch |
|---|---|---|---|---|---|---|---|---|---|---|
| 2 | 0 | (a) | 218,000 | 6,800 | 90 | 9,400 | 8 | 3-4 | 1 min | [4] 0.8-1.4 |
| 3 | 5 | (a) | 250,000 | 6,700 | 31 | 9,360 | 8 | 13.0 | 1 min | 0.91 |
| 4 | 5 | (a) | 25,0000 | 6,85 | 47 | 9,600 | 8 | 11.5 | 1 min | 0.89 |
| 5 | 10 | (a) | 310,000 | 6,860 | 21 | 9,400 | 7 | 10.1 | 150 hours | 0.99 |
| 6 | 10 | (a) | 295,000 | 7,300 | 15 | 9,780 | 8 | 17.0 | do | 0.95 |
| 7 | 20 | (a) | 345,000 | 10,200 | 6 |  |  | 19.0 | 15 min | 0.80 |
| 8 | 30 | (a) | 415,000 | 10,400 | 4 |  |  | 22.2 | 1 min | 0.69 |
| 9 | 5 | (b) | 265,000 | 7,000 | 16 | 9,200 | 7 | 27.5 | 1 min | 1.14 |
| 10 | 5 | (c) | 255,000 | 6,800 | 17 | 9,300 | 8 | 24.3 | 1 min | 1.10 |
| 11 | 10 | (c) | 265,000 | 9,150 | 6 |  |  |  | 1 min |  |

[1] Percent light dispersed by a 10 mil compression molded film, ASTM D-1003-61.
[2] Stress-crack resistance in 50 percent by volume $CH_3OH/H_2O$.
[3] ⅛ x ½ in. compression molded notched bars.
[4] ½ x ½ in. compression molded notched bars.

(a) Coalinga highly refined asbestos.
(b) Chrysotile asbestos floats.
(c) Chrysotile asbestos fibers.

Examples 2–11

The polyhydroxyether-asbestos compositions, containing up to 30% asbestos were prepared by first fluxing the polyhydroxyether on a two roll mill at 130–140° C. with about 1% stearic acid as a lubricant and then adding the desired amount of asbestos and continuing the milling for about 15 minutes to insure adequate mixing. Plaques (20 mils thick) were made from the milled sheet by compression molding at 160–170° C. for 1 to 2 minutes at 2,000–3,000 lbs. gage pressure. Strips cut from these plaques, ¼" x 4" x 0.020", were then bent back on themselves 180° to form a U shape specimen and positioned in 20 mm. x 150 mm. test tubes and covered with a 50% (volume/volume) aqueous methanol solution as the stress-crack inducing chemical environment. Unrefined chrysotile asbestos short fiber and floats was used as a control for comparison with the Coalinga Highly Refined asbestos compositions. Table I contains the time required for these specimens to fail as determined visually by the appearance of crazing.

These data show the completely unexpected change in time to failure in going from 0% to 10% asbestos. Even the change of going from 5% to 10% asbestos results in a change from 1 minute to over 150 hours, an astonishing improvement of more than 10,000%. Equally unexpected is the drop off or reversion of time to failure when 20% asbestos is incorporated into these compositions.

Other pertinent data presented in the table include tensile strength (ASTM D–638–61T), percent elongation (ASTM D–638–61T), yield stress (ASTM D–638–61T), yield elongation (ASTM D–638–61T), Izod impact strength (ASTM D–256–56) and percent haze. The haze test was carried out by measuring the percent light dispersed by a compression molded film of each composition 10 mils thick with a Gardner Pivotable Sphere Hazemeter according to ASTM D-1003-61. All of the test specimens for the Izod impact test were 1/8" x 1/2" compression molded bars except for Example 2 in which 1/2" x 1/2" bars were used.

*Examples 12–17*

The unique interaction of Coalinga refined, water-dispersed, and opened asbestos fibers in contrast to other types of asbestos was demonstrated by solvent resistance comparisons of polyhydroxyether asbestos modified compositions at 5% and 10% levels of asbestos molded at 185° C. The present polyhydroxyether insoluble in refluxing dioxane measured at 1 minute, 15 minutes and 30 minutes was used as the criterion of solvent resistance. As shown in Table II the Coalinga asbestos was superior to other types of unrefined chrysotile including shorts and floats and to blue asbestos.

Asbestos because of its fibrous nature might be expected to distribute the energy on the surface of the sample under stress so that the chances of having a localized area of high energy would be reduced. Asbestos might also be expected to increase the energy required for crack propagation because the path of the crack must go around the asbestos fiber causing the two cracked surfaces to have a larger area which requires more energy for their formation.

For these above statements to be correct, one must assume that the surface of the asbestos comes into intimate contact with the hydroxyl groups of polyhydroxyether and further that there is a strong attraction between these hydroxyl groups and the surface of the abestos fibers.

Experimentally, this is shown by the low haze value (high degree of transparency) shown by 15 mil plaques of polyhydroxyether asbestos compositions. Further, extraction studies using refluxing dioxane indicate that at 6 percent asbestos and above, an appreciable portion (60–

TABLE II

| Example | Asbestos | Percent By Wt. | Percent Polymer insoluble in Refluxing Dioxane Molding Time at 185° C. | | |
|---|---|---|---|---|---|
| | | | 1 min. | 15 min. | 30 min. |
| 12 | Chrysotile (a) | 5 | 32.7 | 32.3 | 50.1 |
| 13 | do | 10 | 53.9 | 58.7 | 68.2 |
| 14 | Chrysotile Floats (b) | 5 | 0 | 0 | 0 |
| 15 | Chrysotile 3 K-shorts (b) | 5 | 25.9 | 25.7 | 35.8 |
| 16 | do | 10 | 25.6 | 36.4 | 46.1 |
| 17 | Blue Asbestos Normite Grade (c). | 5 | 0 | 0 | |

(a) Coalinga refined, water-dispersed and opened short fiber chrysotile asbestos.
(b) From Asbestos Company of America.
(c) From North American Asbestos Corporation.

*Examples 18–23*

The solvent resistance test described in Examples 11–17 were repeated with polyhydroxyether compositions modified with 2 to 12% Coalinga refined asbestos. As shown in Table III maximum resistance to boiling dioxane was attained in the asbestos range of 6–12%. Tensile and other data are also presented in Table III demonstrating that other physical properties are not appreciably altered in this range.

70 percent) of the polymer present is insoluble. The type of bond formed between these two substances is not believed to be a true ionic or covalent bond but rather some type of association similar to hydrogen bonding. Other asbestos samples, other than the Coalinga asbestos, did not produce this remarkable effect on stress-crack resistance and clarity. It is presumed that the effect of the Coalinga asbestos is due to its very high surface area, allowing the indicated interaction to occur efficiently.

TABLE III

| Example | Percent Asbestos | Tensile[1] Strength, p.s.i. | Percent[1] Elongation | Yield,[1] p.s.i. | Percent[1] Elongation at Yield | Percent Insoluble in Dioxane |
|---|---|---|---|---|---|---|
| 18 | 2 | 7,890 | 150 | 8,500 | 7 | 10 |
| 19 | 4 | 8,500 | 140 | 9,350 | 9 | 0 |
| 20 | 6 | 8,450 | 160 | 8,870 | 7 | 67.7 |
| 21 | 8 | 6,500 | 80 | 8,900 | 7 | 59.0 |
| 22 | 10 | 7,370 | 120 | 9,300 | 6 | 61.4 |
| 23 | 12 | 7,360 | 130 | 8,800 | 7 | 65.5 |
| Control | 0 | 8,200 | 140 | 9,350 | 7 | |

[1] ASTM D-638-61T.

While not wishing to be bound by any particular theory, it is proposed that stress-cracking involves two steps, namely initiation and propagation of a crack. The crack is though to be initiated when the localized energy on the surface of a sample under stress becomes greater than the strength of the material and the matrix starts to pull apart. The crack is propagated when the energy stored in the apex of the crack is greater than the energy required to form two new surfaces. The presence of an active solvent (i.e., a stress-cracking agent) reduces the energy for both initiation and propagation.

*Example 24*

The effect of highly refined Coalinga asbestos content in the modified polyhydroxyether compositions on resistance to stress-cracking in Breck blond shampoo sold by John H. Breck, Inc., Springfield, Mass., was also demonstrated. The specimens and test used were the same as those described in Examples 2–11 but time to failure as evidenced by visible crazing was measured at two levels of outer stress, viz., 3500 p.s.i. and 5500 p.s.i. as determined by the method described by James E. Boyd on page 491 of "Strength of Materials," McGraw-Hill, New York, 1935. The data obtained compared with unmodified polyhydroxyether as a control are contained in Table IV.

TABLE IV.—STRESS CRACKING OF ASBESTOS MODIFIED POLYHYDROXYETHER COMPOSITIONS IN SHAMPOO [1]

| Asbestos,[2] percent by weight | Hours to Failure, Various Levels of Outer Fiber Stress, p.s.i. | |
|---|---|---|
| | 5,500 | 3,500 |
| 0 (Control) | 4 | 4-6 |
| 4 | 3-4 | 8 |
| 6 | 8-10 | 8-10 |
| 8 | 8-10 | 24 |
| 10 | 24 | 24 |
| 12 | 24 | 24 |

[1] Breck blond shampoo.
[2] Highly refined Coalinga asbestos.

Although the invention has been described with great particularity in its preferred forms, it is understood that the present disclosure has been made only by way of example, and that numerous changes may be resorted to without departing from the spirit and scope of the invention.

What is claimed is:

1. Transparent stress-crack resistant thermoplastic polyhydroxyether compositions comprising:
    (a) thermoplastic polyhydroxyether having the general formula:

$$\{D\text{—}O\text{—}E\text{—}O\}_n$$

wherein D is the radical residuum of a dihydric phenol, E is a radical residuum of an epoxide and $n$ is an integer which represents the degree of polymerization and is at least 30; and
    (b) from about 2% to 12%, based on the weight of thermoplastic polyhydroxyether of refined, water dispersed, opened chrysotile asbestos fibers having an average wet bulk volume greater than about 300 ml., an average dry bulk density of less than about 6 lbs./cu. ft., an oil adsorption greater than about 14 ml. of dioctyl phthalate/10 grams of chrysotile, an average reflectance of greater than about 72 percent and a magnetic fraction of less than about 1.0 weight percent.

2. The composition claimed in claim 1 wherein the dihydric phenol is a bis(4-hydroxyphenyl)alkane and $n$ is at least 80.

3. The composition claimed in claim 2 wherein the bis(4-hydroxyphenyl)alkane is 2,2-bis(4-hydroxyphenyl)propane.

4. The composition claimed in claim 1 wherein the epoxide is an epihalohydrin and $n$ is at least 80.

5. The composition claimed in claim 4 wherein the epihalohydrin is epichlorohydrin.

6. Shaped articles fabricated from the composition claimed in claim 1.

7. Packaging containers suitable for conveying and displaying substances which induce stress-cracking in thermoplastic polyhydroxyether, fabricated from the composition claimed in claim 1.

8. The containers claimed in claim 7 wherein the stress-crack inducing substance is selected from the group consisting of alcohols, aqueous alcohols, natural oils and saponified natural oils.

References Cited
UNITED STATES PATENTS

| | | | |
|---|---|---|---|
| 3,156,666 | 11/1964 | Pruett | 260—47 |
| 3,177,090 | 4/1965 | Bayes et al. | 260—47 |
| 3,245,865 | 4/1966 | Hawkins et al. | 260—47 |

MURRAY TILLMAN, *Primary Examiner.*

J. C. BLEUTGE, *Assistant Examiner.*